US005779909A

United States Patent [19]

Tomita et al.

[11] Patent Number: 5,779,909

[45] Date of Patent: Jul. 14, 1998

[54] METHOD FOR RECOVERING BINDER RESIN FROM INK RIBBON, METHOD FOR RECOVERING DYE FROM INK RIBBON, APPARATUS FOR RECOVERING INK ACCORDING TO SAID METHOD, AND METHOD FOR PRODUCING RECYCLED INK

[75] Inventors: Hidemi Tomita; Huy Sam, both of Tokyo; Haruo Watanabe; Misao Kusunoki, both of Kanagawa, all of Japan

[73] Assignee: Sony Corporation, Tokyo, Japan

[21] Appl. No.: 727,039

[22] Filed: Oct. 8, 1996

[30] Foreign Application Priority Data

Oct. 13, 1995 [JP] Japan .................................... 7-292027

[51] Int. Cl.[6] ...................................................... B01D 11/02

[52] U.S. Cl. ........................... 210/712; 210/634; 210/917; 134/15; 134/26; 134/38; 252/364; 422/261; 510/174

[58] Field of Search ............................... 510/174; 134/15, 134/26, 32, 38; 252/364; 210/634, 702, 712, 729, 917; 422/261

[56] References Cited

FOREIGN PATENT DOCUMENTS 1556358 11/1979 United Kingdom .

*Primary Examiner*—Erma Cameron

*Attorney, Agent, or Firm*—Hill & Simpson

[57] ABSTRACT

Disclosed herein is a method for recovering binder resin from the ink layer of ink ribbon, said method comprising collecting ink ribbon having an ink layer consisting of dye and binder resin, dissolving the ink layer of ink ribbon in a solvent in which dye and binder resin are soluble, freeing the resulting solution of insoluble matter, concentrating the solution, pouring the resulting concentrate into a solvent in which dye is soluble but binder resin is substantially insoluble, thereby precipitating binder resin, and separating and drying precipitates. By concentrating the solution remaining after precipitation of binder resin and drying the concentrate, it is possible to recover dye. Disclosed also herein is an apparatus for recovering dye and binder resin according to said method.

16 Claims, 6 Drawing Sheets

METHOD FOR RECOVERING BINDER RESIN FROM INK RIBBON, METHOD FOR RECOVERING DYE FROM INK RIBBON, APPARATUS FOR RECOVERING INK ACCORDING TO SAID METHOD, AND METHOD FOR PRODUCING RECYCLED INK

BACKGROUND OF THE INVENTION

1. Field of the Invention

The present invention relates to a method for recovering dye and binder resin from the ink layer of ink ribbon having thermal transfer ink layers, an ink recovering apparatus and ink recovering head used for their recovery, and a method for producing recycled ink ribbon from the recovered dye and binder resin.

2. Description of the Related Art

Among known printing systems is the sublimation thermal printing system. It utilizes ink ribbon containing a sublimable or thermally diffusible dye. At the time of printing, it is placed on dye-receptive printing paper and heated by a thermal head in response to image and character information so that the dye is transferred from the ink ribbon to the printing paper to form images thereon. This system is attracting attention as a means to convert video images into hard copies because of its ability to form high-quality full-color images with continuous gradation.

The ink ribbon of this type is schematically shown in FIG. 1. It consists of a substrate 81 (such as polyester film) and a thermal transfer ink layer 82 formed thereon. The substrate 81 may be backed with a heat-resistant slip layer 83 as required. The thermal transfer ink layer 82 is formed by gravure coating or the like (followed by drying) from an ink composition consisting of a sublimable or thermally diffusible dye, a binder resin, and a solvent (such as toluene and 2-butanone) for their dissolution or dispersion therein.

The production of ink ribbon yields waste resulting from the trimming of edges and ends of the rollstock. This waste is simply discarded. In addition, used ink ribbon is also discarded without reuse.

Being rather expensive, the dye contained in the ink layer accounts of a nonnegligible portion in the raw material cost of ink ribbon. This is true particularly for the dye used in the sublime thermal transfer printing system. Therefore, it is desirable to recover expensive dye from ink ribbon waste to reduce the production cost of ink ribbon. In the case of ink ribbon for full-color printing, it is necessary to carry out recovery separately for four dyes, which are yellow (Y), magenta (M), cyan (C), and black (K).

Ink ribbon waste poses another problem associated with environmental pollution because the binder resin contained in the ink layer is mostly non-biodegradable.

In addition, there is a demand for an apparatus which would be able to recover dye and binder resin from ink ribbon without the necessity of cutting the used ink ribbon in roll form.

OBJECT AND SUMMARY OF THE INVENTION

The present invention is intended to address the above-mentioned problems involved in the prior art technology. It is an object of the present invention to provide a method for recovering dye and binder resin from waste ink ribbon or used ink ribbon for their recycling. It is another object of the present invention to provide a method for producing recycled ink ribbon from the recovered dye and binder resin.

Thus, the present invention will be useful for the recycling of waste ink ribbon (which occurs in the production of sublime thermal transfer printing ink ribbon) and used ink ribbon.

The present inventors found that the above-mentioned object can be achieved by several methods. That is, it is possible to recover binder resin and dye by the steps of dissolving the ink layer of recovered ink ribbon in a solvent capable of dissolution of binder resin and dye contained therein, freeing the solution of insoluble matter, concentrating the solution, and pouring the concentrate into a specific solvent for reprecipitation (for recovery of binder resin), and concentrating the supernatant liquid remaining after precipitation (for recovery of dye). Dye recovery may be accomplished by extracting dye from the ink layer using a solvent which dissolves substantially only dye, or by subliming dye from the ink layer. This finding led to the present invention. In addition, it was also found that recovery of dye and binder resin by dissolution in a solvent is facilitated if used ink ribbon is treated in roll form by the aid of a recovery head which helps dissolve at least either of dye or binder resin in a solvent. This finding led to the ink recovery apparatus of the present invention.

The first aspect of the present invention resides in a method for recovering binder resin from the ink layer of ink ribbon, said method comprising collecting ink ribbon having an ink layer consisting of dye and binder resin, dissolving the ink layer of ink ribbon in a solvent in which dye and binder resin are soluble, freeing the resulting solution of insoluble matter, concentrating the solution, pouring the resulting concentrate into a solvent in which dye is soluble but binder resin is substantially insoluble, thereby precipitating binder resin, and separating and drying precipitates.

The second aspect of the present invention resides in a method for recovering dye from the ink layer of ink ribbon, said method comprising collecting ink ribbon having an ink layer consisting of dye and binder resin, dissolving the ink layer of ink ribbon in a solvent in which dye and binder resin are soluble, freeing the resulting solution of insoluble matter, concentrating the solution, pouring the resulting concentrate into a solvent in which dye is soluble but binder resin is substantially insoluble, thereby precipitating binder resin, concentrating the solution remaining after precipitation of binder resin, and drying the concentrate.

The third aspect of the present invention resides in a method for recovering binder resin from the ink layer of ink ribbon, said method comprising collecting ink ribbon having an ink layer consisting of dye and binder resin, treating the ink layer of ink ribbon with a solvent in which dye is soluble and binder resin is substantially insoluble, thereby removing by dissolution dye from the ink layer, treating the remaining ink layer with a solvent in which binder resin is soluble, thereby dissolving binder resin in the solvent, freeing the resulting solution of insoluble matter, concentrating the solution, pouring the resulting concentrate into a solvent in which dye is soluble but binder resin is substantially insoluble, thereby precipitating binder resin, and separating and drying precipitates.

The fourth aspect of the present invention resides in a method for recovering dye from the ink layer of ink ribbon, said method comprising collecting ink ribbon having an ink layer consisting of dye and binder resin, treating the ink layer of ink ribbon with a solvent in which dye is soluble but binder resin is substantially insoluble, thereby dissolving in the solvent the dye in the ink layer, freeing the resulting solution of insoluble matter, concentrating the solution, and drying the concentrate.

The fifth aspect of the present invention resides in a method for recovering dye from the ink layer of ink ribbon, said method comprising collecting ink ribbon having an ink layer consisting of dye and binder resin, and treating the ink ribbon with vacuum or heating, thereby subliming the dye in the ink layer.

The sixth aspect of the present invention resides in a method for producing recycled ink ribbon, said method including the steps of uniformly dispersing or dissolving binder resin and dye in an ink solvent, thereby preparing an ink composition, applying the ink composition to an ink ribbon substrate, and drying the coating layer, thereby forming a thermal transfer ink layer, characterized in that the binder resin is one which has been recovered by the above-mentioned binder resin recovery method and the dye is one which has been recovered by the above-mentioned dye recovery method.

The seventh aspect of the present invention resides in an ink recovery apparatus for recovering at least either of dye or binder resin from ink ribbon having an ink layer consisting of dye and binder resin by dissolution in a solvent in which at least either of dye or binder resin is soluble, said apparatus comprising a means to transfer ink ribbon, an ink recovery head for dissolving at least either of dye or binder resin in said solvent, a liquid reservoir holding the solvent in which at least either of dye or binder resin is soluble, and a means to supply the solvent from the liquid reservoir to the ink recovery head and return to the liquid reservoir the solvent which has dissolved at least either of dye or binder resin in the ink recovery head.

The eighth aspect of the present invention resides in an ink recovery head for recovering at least either of dye or binder resin from ink ribbon having an ink layer consisting of dye and binder resin by dissolution in a solvent in which at least either of dye or binder resin is soluble, said ink recovery head comprising a container to hold the solvent, and a means to hold the solvent in contact with the solvent in the container and to bring the solvent held therein into contact with the ink layer of ink ribbon.

DETAILED DESCRIPTION OF THE PREFERRED EMBODIMENTS

Figure 1:
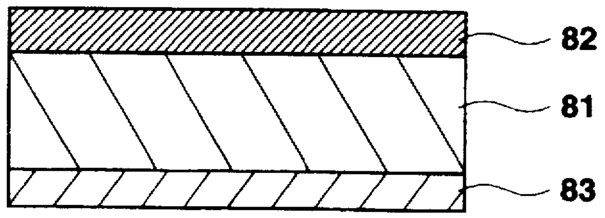
FIG. 1 is a sectional view of ink ribbon.

A detailed description of the invention follows.

According to the first aspect of the present invention, the method of recovering binder resin starts with collecting ink ribbon having an ink layer consisting of dye and binder resin. Ink ribbon for this purpose includes waste ink ribbon and rejected ink ribbon that occur in the ink ribbon production and also includes used ink ribbon. Collecting ink ribbon separately according to ink color will improve the efficiency of dye recovery.

In the subsequent step, the ink layer of ink ribbon is dissolved in a solvent capable of dissolution of dye and binder resin. This step gives a solution containing dye and binder resin. No specific restrictions are imposed on the method of dissolving dye and binder resin from the ink layer. Dissolution may be accomplished by cutting ink ribbon (of the same color) into small pieces and soaking them in a solvent for dye and binder resin. An alternative method consists of spraying the ink layer of ink ribbon with a solvent. A simple way for dissolution is to rub the ink layer mechanically or manually with cloth, paper, sponge, plastics, gel, or the like moistened with a solvent. It is also possible to scrape off the ink layer with a knife and dissolving it in a solvent.

The dye to be recovered includes any known sublimation dye, thermal diffusion dye, and disperse dye. Other examples include oil-soluble dye, reactive disperse dye, leuco dye, basic dye, and cationic dye. These dyes may be used alone or in combination with one another according to requirements for hue, sensitivity at the time of printing, and weather resistance of transferred images. Typical examples of the dye include those derived from diarylmethane, triarylmethane, thiazole, methine, azomethine, xanthine, oxazine, thiazine, azine, acridine, azo compounds, spirodipyran, indolinospiropyran, fluoran, rhodaminelactum, anthraquinone, indoaniline, cyanostyryl, imidazole, quinophthalone, and the like.

The binder resin to be recovered includes any known ones, such as polyvinyl acetal resin, polyester resin, ethylene-vinyl acetate copolymer, polycarbonate resin, cellulose derivative, acrylic resin, and the like. They may be used alone or in combination with one another.

The solvent in which binder resin and dye are soluble may be properly selected from any known ones according to the kind and amount of binder resin and dye to be recovered. Typical examples of the solvent include toluene, 2-butanone, and dichloroethane. They may be used in combination with lower alcohol. (Incidentally, 2-butanone may be used in combination with water.)

Subsequently, the solution containing binder resin and dye is freed of insoluble matter. Removal of insoluble matter such as dust and impurities is necessary for recycling. The method of removing insoluble matter is not specifically restricted, and it may include any known physical and chemical methods such as filtration, reprecipitation, washing, chromatography, sublimation, and recrystallization.

The solution freed of insoluble matter is concentrated so as to increase the concentration of solids in the solution, thereby facilitating separation of binder resin from dye. This will be mentioned later.

The solution concentration may be accomplished by any known physical and chemical methods, such as vacuum evaporation.

The resulting concentrate is poured into a solvent in which dye is soluble but binder resin is substantially insoluble. This step permits binder resin alone to precipitate (for separation) without dye precipitating. A common solvent for this step is a saturated hydrocarbon such as n-hexane. Separation of precipitates may be accomplished by any known methods such as decantation, vacuum filtration, and centrifuging.

In the case where the separated binder resin is colored with dye, it is possible to remove dye completely by reprecipitation. That is, the colored binder resin is dissolved in a small amount of solvent and the solution is poured again into another solvent in which dye is soluble but binder resin is substantially insoluble.

Finally, the thus separated binder resin is dried by any known methods. In this way it is possible to recover binder resin for recycling.

According to the second aspect of the present invention, the method for recovering dye starts with collecting ink ribbon having an ink layer consisting of dye and binder resin. In the subsequent step, the ink layer of ink ribbon is treated with a solvent in which dye and binder resin are soluble, so that dye is dissolved in the solvent. The resulting solution is freed of insoluble matter and concentrated. The resulting concentrate is poured into a solvent in which dye is soluble but binder resin is substantially insoluble so that binder resin precipitates. The steps up to this stage are the same as those for the recovery of binder resin in the first aspect mentioned above. In this way there is obtained a dye solution containing precipitates of binder resin.

The dye solution is freed of binder resin precipitates and then concentrated. The resulting concentrate is dried. The methods for separation of binder resin precipitates are by decantation, vacuum filtration, centrifuging, and the like, which are known well. Concentration of the dye solution and its subsequent drying may also be accomplished by any known methods.

According to the third aspect of the present invention, the method for recovering binder resin starts with the collecting of ink ribbon having an ink layer consisting of dye and binder resin as in the case of the first aspect.

The ink layer of the collected ink ribbon is treated with a solvent in which dye is soluble but binder resin is substantially insoluble, so that dye is dissolved in the solvent. As the result, dye is removed from the ink layer and binder resin remains in the ink layer. Incidentally, the solvent treatment of the ink layer may be accomplished in the same manner as in the first aspect.

The solvent in which dye is soluble but binder resin is substantially insoluble may be properly selected from known ones according to the kind and amount of dye and binder resin. Organic solvents having a solubility parameter of 11 or above are favorable. The solubility parameter is the square root of the cohesive energy density and is a measurement used to predict the miscibility of solutions by their enthalpies of vaporization. The solubility parameters for the solvents discussed below are indicated in parentheses. They include, for example, methanol (14.5), ethanol (12.7), acetonitrile (11.8), butanol (11.4), acetanilide (11.7), dimethylformamide (12.1), and cyclohexanol (11.4). A mixture of 2-butanone with water or methanol may also be used as a solvent.

Subsequently, the binder resin remaining in the ink layer is treated with a solvent in which binder resin is soluble. Thus there is obtained a solution of binder resin. The solvent capable of dissolving binder resin may be the same one as used in the first aspect. Additional examples of the solvent include xylene, benzene, acetone, cyclohexanone, and chloroform.

As in the method of the first aspect, the solution containing binder resin is freed of insoluble matter and then concentrated. The resulting concentrate is poured into a solvent in which binder resin is substantially insoluble, so that binder resin is precipitated. Finally, the precipitates are dried. In this way it is possible to recover binder resin for recycling.

According to the fourth aspect of the present invention, the method for recovering dye starts with the collecting of ink ribbon having an ink layer consisting of dye and binder resin, as in the third aspect for dye recovery. The ink layer of the collected ink ribbon is treated with a solvent in which dye is soluble but binder resin is substantially insoluble, so that dye is dissolved in the solvent. In this way it is possible to extract dye from the ink layer and to obtain a dye solution containing no binder resin. The steps up to this stage are the same as those in the third aspect for dye recovery.

The solvent in which dye is soluble but binder resin is substantially insoluble should preferably be an organic solvent which has a solubility parameter of 11 or above, as in the case of the third aspect.

The dye solution is freed of insoluble matter as in the second aspect, and the solution is concentrated and the concentrate is dried. In this way it is possible to recover dye for recycling.

According to the fifth aspect of the present invention, the method for recovering dye starts with the collecting of ink ribbon having an ink layer consisting of dye and binder resin, as in the first aspect for dye recovery.

The ink layer of ink ribbon is treated with vacuum or heating, so that dye in the ink layer is sublimed. By collecting sublimed dye, it is possible to recover dye. After dye sublimation, binder resin remains in the ink layer. Treatment with vacuum or heating may be accomplished in the usual way.

In the case of treatment with heating, efficient dye recovery may be achieved when the heating temperature is higher than the glass transition point of the binder resin in the ink layer. A recommended heating temperature is usually above 50° C., preferably 100°–250° C. For protection of dye from oxidation and degradation by heating, it is desirable that heating be carried out under an atmosphere of inert gas such as nitrogen. A more favorable practice is heating under reduced pressure for accelerated dye sublimation. The degree of reduced pressure may be properly established as required; it is usually 600 mmHg or so.

The above-mentioned first to fourth aspect of the present invention can be practiced by using the ink ribbon recovery system and the ink ribbon solvent treatment system which are described below with reference to FIG. 2.

Figure 2:
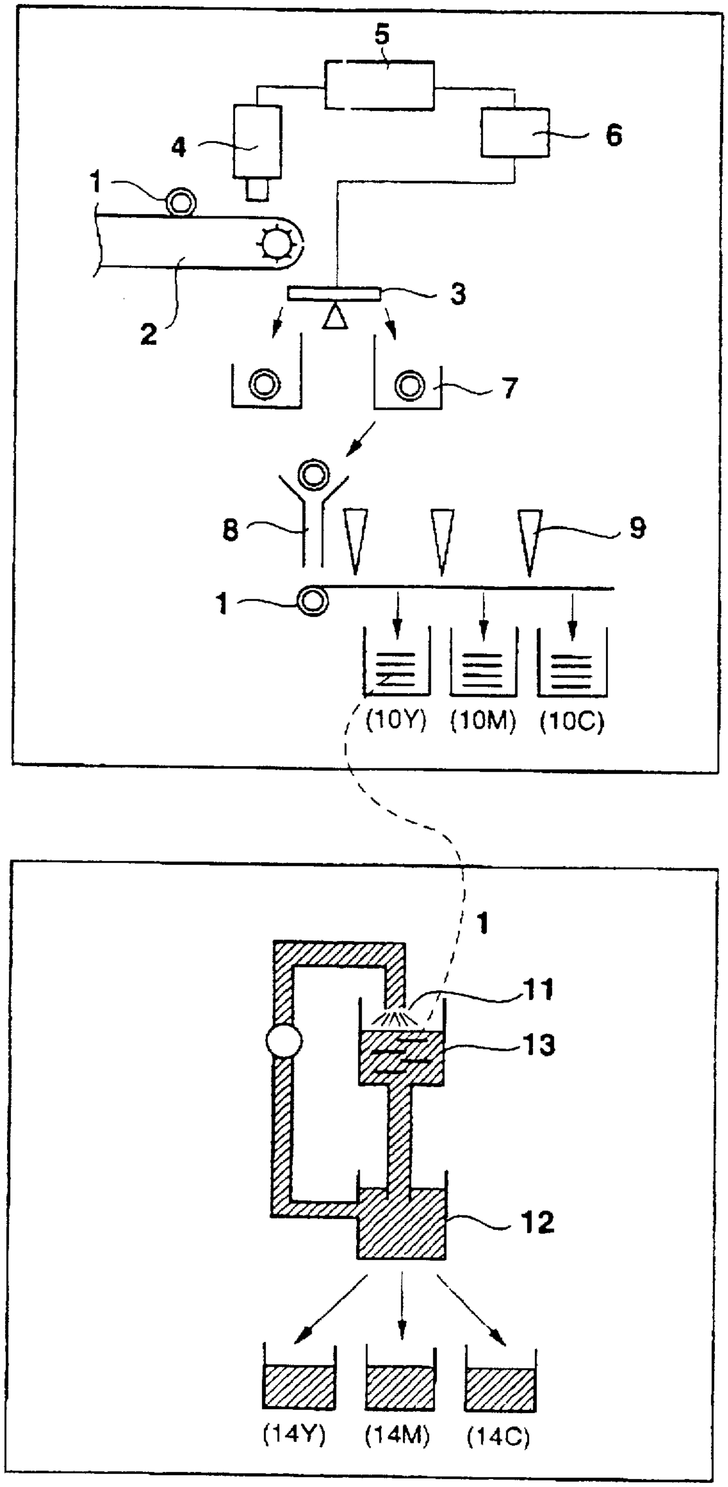
FIG. 2 is a diagram illustrating the ink ribbon recovery system and ink ribbon solvent treating system.

The ink ribbon recovery system shown in FIG. 2 has a belt conveyor 2 which carries recovered ink ribbon 1 to a selector plate 3 for classification of recovered ink ribbon according to its kind. Classified ink ribbon is collected in a box 7. Classification is accomplished by the controller 6 which operates the selector plate 3 according to signals from the image recognition unit 5 connected to a camera 4. If necessary, the classified ink ribbon 1 is thrown into a hopper 8 and shred by a cutter 9. Shred ink ribbon is collected in three boxes 10Y, 10M, and 10C. The thus classified ink ribbon 1 is thrown into the ink ribbon solvent treatment system.

Figure 3:
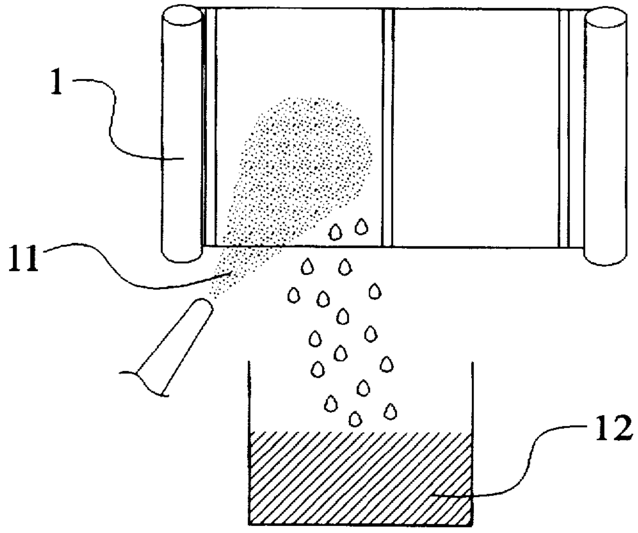
FIG. 3 is a diagram illustrating the ink ribbon solvent treating system.

The shredding of ink ribbon is not required in the case where the ink layer of ink ribbon 1 is sprayed with a solvent 11 and the dripping solvent is collected in a recovery tank 12 as shown in FIG. 3 or in the case where the ink layer is wiped off with a solvent-impregnated cloth.

The ink ribbon solvent treatment system as shown in FIG. 2 has sorted ink ribbon 1 sprayed with a solvent 11 in a sprayer 13. The solvent 11 returns to a reservoir 12 for circulation. The resulting solutions (14Y, 14M, 14C) each containing dye or binder resin or both are collected separately according to the kind of solute. They are freed of insoluble matter in the usual way (such as vacuum filtration), and they undergo the subsequent step for recovery of dye or binder resin or both.

Figure 4:
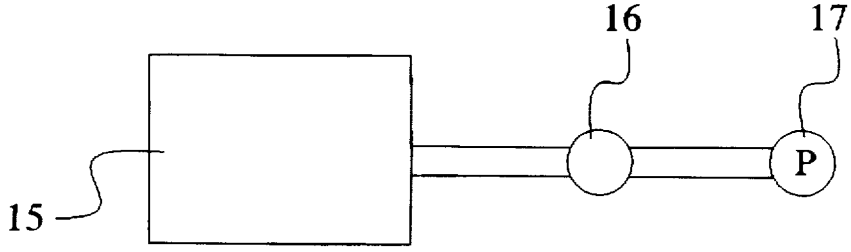
FIG. 4 is a diagram illustrating the dye sublimation recovery system.

The above-mentioned ink ribbon solvent treatment system may be replaced by a dye sublimation recovery system which consists of a vacuum heat chamber 15, a cooling recovery unit 16, and a vacuum pump 17 connected thereto, as shown in FIG. 4. This system causes dye to sublime in the vacuum heat chamber 15 and solidify in the cooling recovery unit 16, thereby permitting the recovery of dye.

The above-mentioned binder resin recovery method, dye recovery method, and ink ribbon solvent treatment system have in common the step of isolating either or both of dye and binder resin by dissolution in a solvent. In the case of the ink recovery apparatus pertaining to the seventh aspect of the present invention, this dissolving step is carried out continuously without ink ribbon rolls being cut into pieces.

Figure 5:
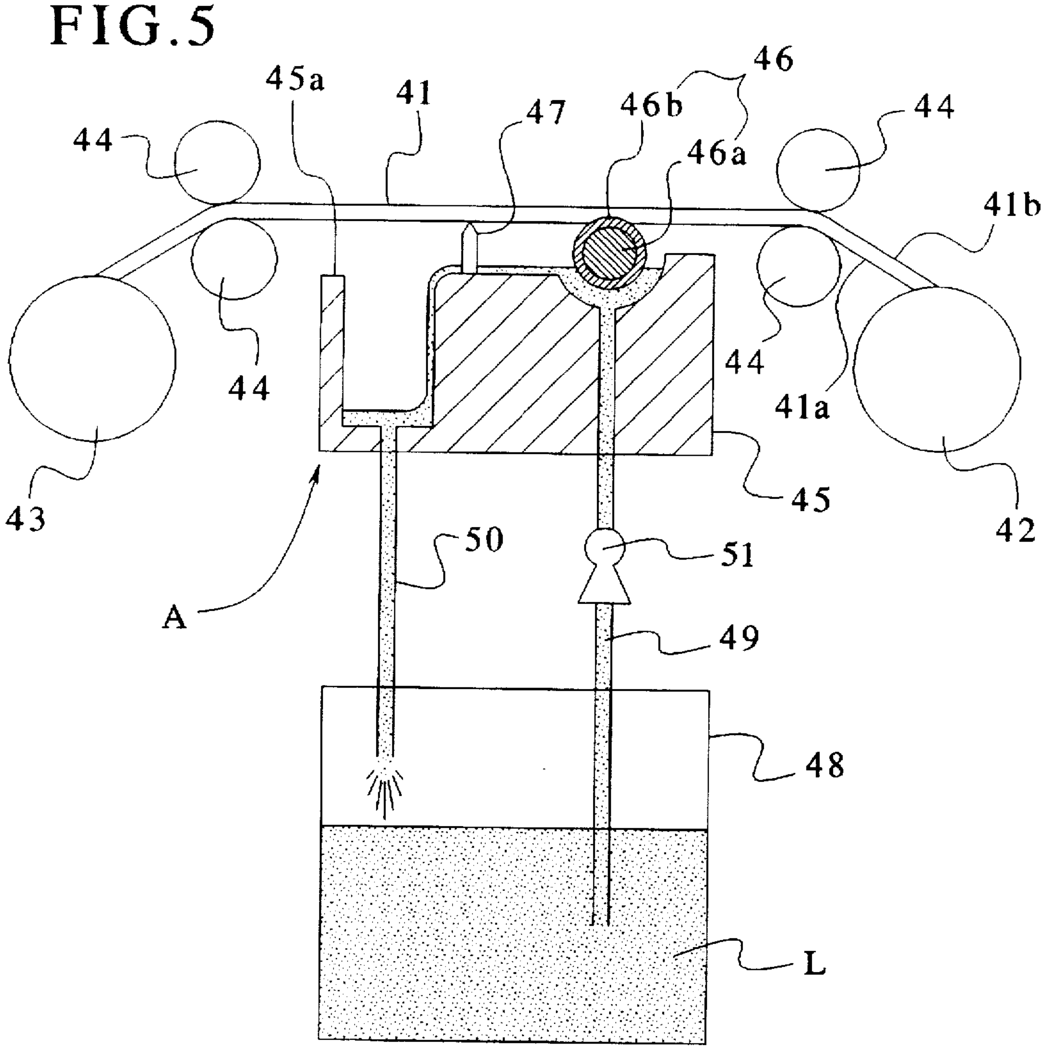
FIG. 5 is a schematic diagram of the ink recovery apparatus pertaining to the present invention.

An example of the ink recovery apparatus is shown in FIG. 5. It consists of a means to transfer ink ribbon 41, ink recovery head A (to dissolve at least either of dye or binder resin in solvent L), solution tank 48 (to hold solvent L in which at least either of dye or binder resin has been dissolved), and a means to supply solvent L to the ink recovery head A from the solution tank 48 and to return the solvent L (in which at least either of dye or binder resin has been dissolved) to the solution tank 48 from the ink recovery head A.

In the apparatus shown in FIG. 5, the transfer means consists of an ink ribbon feeder roll 42, an ink ribbon take-up roll 43, and guide rolls 44. The transfer of ink ribbon 41 may be accomplished by a motor which drives the axle of the feeder roll 42. Alternatively, it may be accomplished by a drive unit installed between the feeder roll 42 and the ink recovery head A. (Driving the take-up roll 43 is not recommended because of slipping that would occur if the ink ribbon is not completely dried.)

It is remarked that the number of guide rolls 44, which is four in FIG. 5, is not fixed but may be varied as required.

The ink recovery head A consists of a vessel 45 to hold solvent L and a means 46 to bring solvent L into contact with the ink ribbon surface **41*a* to be treated. The means 46 is in contact with solvent L and retains solvent L therein. The surface 46*b* may be a stationary flat brush or sponge or a rotatable brush or sponge mounted on an axle 46*a*. The axle 46*a* may be driven in the forward or backward direction by a motor or may be free to rotate as the ink ribbon 41** runs. The brush or sponge may be favorably replaced by a glass fiber cloth tube which is superior in solvent resistance, friction resistance, and solvent retaining properties, and causes almost no damage to ink ribbon.

The ink recovery head A should preferably have a means 47 to remove solvent from ink ribbon 41 running past it. Such a means may be made of brush, sponge, or cloth capable of absorbing solvent. It should preferably be installed on the vessel 45 in such a way that it comes into contact with the treating surface **41*a* of ink ribbon 41. In addition, it should be positioned behind the means 46 or preferably between the means 46 and that end 45*a*** of the ink recovery head A which is close to the take-up roll.

The ink recovery apparatus also has a liquid tank 48 to hold solvent L which dissolves at least either dye or binder resin. Solvent L is supplied to the recovery head A and then returned to the liquid tank 48 after it has dissolved at least either of dye or binder resin. This circulation means consists of a supply passage 49, a return passage 50, and a pump 51. The passage 49 extends from the liquid tank 48 to the ink recovery head A, and the passage 50 extends from the ink recovery head to the liquid tank 48. The pump 51 is installed midway the passage 49, so that it supplies the solvent to the ink recovery head A.

The embodiment as shown in FIG. 5 is designed such that the ink ribbon 41 is fed from the feed roll 42 and carried past the ink recovery head A. While the ink ribbon 41 is being fed, solvent L is continuously supplied by the pump 51 from the liquid tank 48 to the vessel 45 of the ink recovery head A through the passage 49. Then, solvent L is allowed to overflow the vessel 45 and continuously returned to the liquid tank 48 through the returned passage 50. During circulation, part of solvent L is retained by the means 46, so that it dissolves at least either dye or binder resin from the treating surface **41*a* of the ink ribbon 41 which moves in contact with the means 46. After dissolution of at least either of dye or binder resin, the solvent L retained by the means 46 diffuses into the solvent L held in the vessel 45 and then overflows it, returning to the liquid tank 48 through the return passage 50. The thus treated ink ribbon 41 has its treated surface cleared of solvent L by the means 47, and it finally goes to the take-up roll 43**.

There may be an instance where the treating surface **41*a* of the ink ribbon 41 has an ink layer or laminate layer formed thereon which is not to be recovered. In this case it is necessary to prevent the means 46 from coming into contact with the ink ribbon 41. To this end it is desirable to move the guide rolls 44 upward or move the ink recovery head A downward without hindering the transfer of ink ribbon 41**.

During operation of the ink recovery head A, care should be exercised to prevent solvent L from coming into contact with the back surface **41*b* of the ink ribbon 41** which may have a solvent-soluble slip layer formed thereon.

Figure 6:
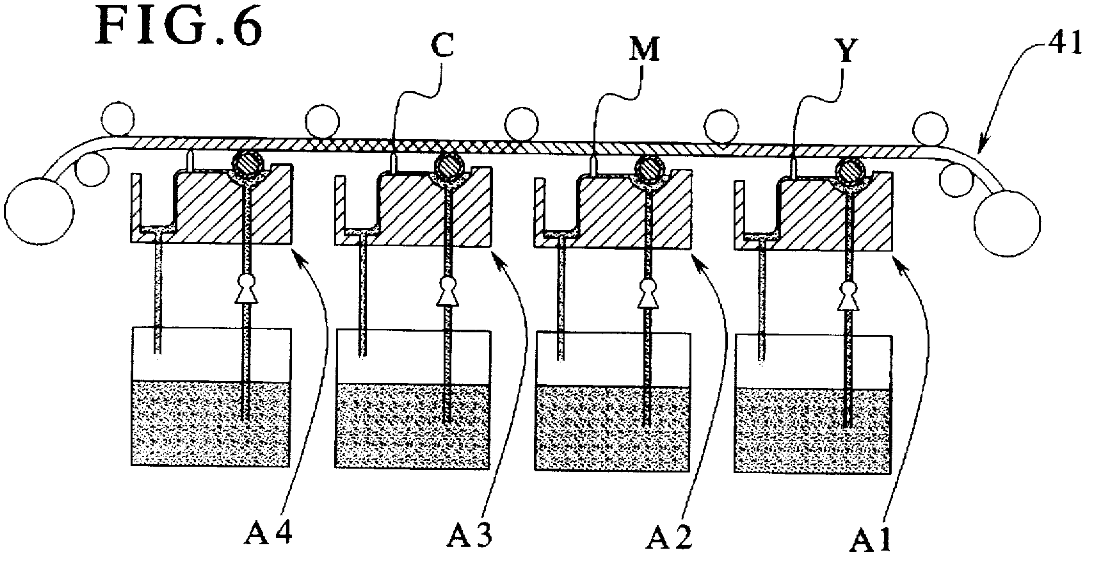
FIG. 6 is a schematic diagram of the ink recovery apparatus pertaining to the present invention.

The embodiment shown in FIG. 5 has only one unit of ink recovery head A; however, it is desirable to use at least as many units as the number of colors in the ink layer of ink ribbon 41. Usually there are three colors—yellow (Y), magenta (M), and cyan (C)—in an ink layer. The ink recovery apparatus shown in FIG. 6 is designed to treat ink ribbon 41 having a three-color ink layer. It has four ink recovery heads—A1 for yellow ink recovery, A2 for magenta ink recovery, A3 for cyan ink recovery, and A4 for complete removal of residual ink. A4 makes the ink ribbon substrate completely clean for its recycling. These heads work in the same manner as explained with reference to FIG. 5.

The ink recovery apparatus of the present invention permits dye and binder resin to be recovered separately or together depending on the kind of solvent used. The ink recovery head A shown in FIG. 5 may be used for any ink recovery apparatus constructed differently than shown in FIG. 5.

After operations as mentioned above by the method of the present invention, the recovered dye and binder resin will find various uses, preferably as a raw material of the ink composition for recycled ink ribbon. The method for producing recycled ink ribbon, as defined in the sixth aspect of the present invention, will be described in the following.

The procedure starts with uniformly dispersing or dissolving the recovered dye and binder resin in an ink solvent, thereby preparing an ink composition. This step may be carried out in the usual way.

As the dye and the binder resin, those recovered from the above-mentioned dye recovering and binder resin recovering methods, respectively, may be used. The ratio of dye to binder resin in the ink composition should be 0.3–3.0, preferably 0.6–2.5, by weight. Below this ratio, the transferred image will have a low density. Above this ratio, the ink ribbon will be poor in storage properties.

An adequate ink solvent may be selected according to the kind of dye and binder resin used. Typical solvents are toluene and 2-butanone. The amount of solvent may be determined in consideration of the stability and coating properties of the ink composition.

The ink composition may be incorporated with any known commonly used additives, such as cross-linking agent (like polyisocyanate), antioxidant, UV light absorber, plasticizer, release agent, and inorganic filler.

Upon application of the thus prepared ink composition onto an ink ribbon substrate, followed by drying, there is obtained recycled ink ribbon having a thermal transfer ink layer formed thereon. In this way the recycling of ink ribbon becomes possible.

Application and ensuing drying of the ink composition may be accomplished by using any known applicator and drier. An example of applicators is a gravure coater. Coating conditions such as coating thickness and coating rate may be established at discretion. An example of driers is a hot-air drier. Drying conditions such as drying temperature and drying time may be established at discretion.

The ink ribbon substrate may be properly selected from conventional ones, such as polyester film, polystyrene film, polysulfone film, polyimide film, polyivnyl alcohol film, aramid film, polyether film, polyether ether ketone film, polyparabanic acid resin film, and other plastics film, and condenser paper. It is usually 1–50 μm thick, preferably 2–10 μm thick, with no specific restrictions imposed thereon.

The method for producing the recycled ink ribbon according to the present invention should preferably include, as required, a step of forming a heat-resistant slip layer on the back side of the ink ribbon substrate before or after the formation of the thermal transfer ink layer. This heat-resistant slip layer is usually formed by coating, followed by drying, the back side of the substrate with a liquid composition composed of binder resin, inorganic filler, cross-linking agent, release agent, etc. dissolved or dispersed in a solvent.

The binder resin may be selected from polyvinyl acetal resin, polyester resin, ethylene-vinyl acetate copolymer, polycarbonate resin, cellulose derivative, acrylic resin, etc. individually or in combination with one another. The inorganic filler may be selected from titanium oxide, kaolin clay, calcium carbonate, silica fine powder, etc. The release agent may be selected from polyethylene wax, teflon powder, fluorine-based surfactant, phosphate ester-based surfactant, silicone oil, high-melting silicone wax, etc. The crosslinking agent may be selected from epoxy-based hardener, isocyanate-based hardener, etc.

As mentioned above, the present invention provides a method for recovering dye and binder resin from waste ink ribbon, so that it permits one to produce recycled ink ribbon from the recovered dye and binder resin.

The invention will be described with reference to the following examples.

EXAMPLE 1

(Preparation of Original Ink Ribbon)

Original ink ribbon with three colors (Y, M, C) was prepared as follows from original raw materials listed below.

Binder resin (butyral resin 6000AS from Denki Kagaku Kogyo K.K.)

Yellow (Y) dye (FORON YELLOW, from Sandoz Co., Ltd.)

Magenta (M) dye (a 1:1 (by weight) mixture of M1 dye (FORON RED, from Sandoz Co., Ltd.) and M2 dye (ESC451, from Sumitomo Chemical Co., Ltd.))

Cyan (C) dye (FORON BLUE, from Sandoz Co., Ltd.)

The binder resin and each dye (1:1 by weight) were dissolved in a mixture of toluene and 2-butanone (1:1 by weight) to give an ink composition containing 8% solids.

Each ink composition was applied to a 6-μm thick polyester film by using a gravure coater such that the coating thickness after drying was 2 μm. The coating step was followed by drying with hot air at 120° C. Thus there was obtained ink ribbon having an ink layer of three colors (Y, M, C).

This ink ribbon was used for color image printing on commercial printing paper (UPC-7010) by a video printer (UPD-7000), both made by Sony Corp. After repeated printing for 100 images, the used print ribbon was discarded.

(Recovery of Binder Resin)

The discarded ink ribbon was cut into pieces for each color, and they were soaked in 2-butanone separately. Thus there were obtained three dye solutions each containing binder resin and each dye of Y, M, and C.

The dye solution was strained through a 5-μm filter and then concentrated by heating to remove excess solvent.

The resulting concentrate was poured with stirring into n-hexane in excess amount, so as to precipitate binder resin. The precipitates of binder resin were filtered out.

The separated binder resin carrying residual dye was decolorized by repeating the above step (dissolution in 2-butanone and precipitation in excess n-hexane) three times.

The precipitates of decolorized binder resin were filtered off from n-hexane and then vacuum-dried at 120° C. In this way binder resin was recovered, with the recovery being 75%. The recovered binder resin was found by GPC analysis to have a molecular weight almost comparable to that of binder resin in the ink layer of original ink ribbon.

(Recovery of Dye)

The n-hexane solution left after binder resin had been removed was examined by column chromatography for impurities other than dye. There was no sign of impurities.

Each n-hexane solution was freed of solvent by evaporation so as to recover dye in the form of purified crystals. The recovered dye was found by liquid chromatography to be identical with each dye used for the original ink ribbon, with the ratio of M1 to M2 remaining unchanged.

EXAMPLES 2 TO 10

The recovered dye and recovered binder resin obtained in Examples 1 were made into respective ink compositions of Y, M, and C according to the formulation shown in Table 1. Use was made of these ink compositions to prepare recycled ink ribbon in the same manner as in Example 1 for original ink ribbon.

TABLE 1

| | Example No. | | | | | | | | |
|---|---|---|---|---|---|---|---|---|---|
| | 2 | 3 | 4 | 5 | 6 | 7 | 8 | 9 | 10 |
| Resin binder | | | | | | | | | |
| Original | 75 | 50 | 25 | — | — | — | — | — | — |
| Recovered | 25 | 50 | 75 | 100 | 100 | 100 | 100 | 100 | 100 |
| Y dye | | | | | | | | | |
| Original Y | 100 | 100 | 100 | 100 | — | 10 | 30 | 50 | 70 |
| Recovered Y | — | — | — | — | 100 | 90 | 70 | 50 | 30 |
| M dye | | | | | | | | | |
| Original M1 | 50 | 50 | 50 | 50 | 18 | 26 | 30 | 38 | 46 |
| Original M2 | 50 | 50 | 50 | 50 | 2 | 14 | 20 | 32 | 44 |
| Recovered M | — | — | — | — | 80 | 60 | 50 | 30 | 10 |
| C dye | | | | | | | | | |
| Original C | 100 | 100 | 100 | 100 | 100 | 10 | 30 | 50 | 70 |
| Recovered C | — | — | — | — | — | 90 | 70 | 50 | 30 |

The recycled ink ribbon with three colors and the original ink ribbon prepared in Example 1 were used for step printing on commercial printing paper (UPC-7010) by a commercial video printer (UP-D7000), both made by Sony Corp.

The resulting images were examined for gamma (sensitivity) and color difference in the following manner.

(Gamma)

Figure 7:
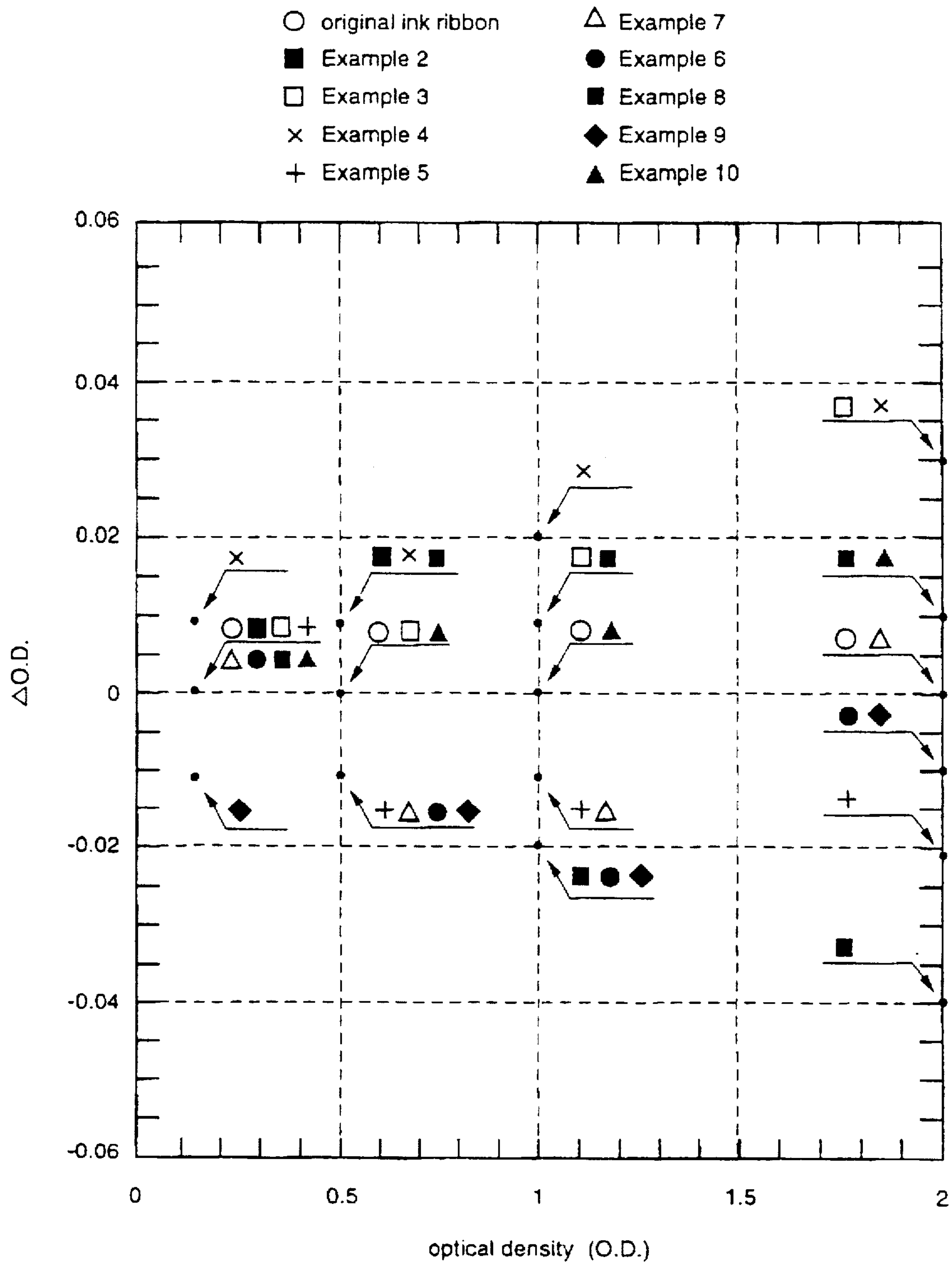
FIG. 7 is a diagram illustrating the gamma of the image produced by the recycled ink ribbon obtained in Examples 2 to 10.

The resulting step images were measured for optical density (OD) by using a Macbeth densitometer. The image obtained from the original ink ribbon was regarded as reference. A search was made for the condition under which the reference image produces an optical density of 0.1, 0.5, 1, or 2. The recycled ink ribbon was used to make images under the same condition as mentioned above. The resulting images were compared with the reference images to see the density difference (ΔOD). The results are shown in FIG. 7.

It is desirable that the density difference be within ±0.05 for practical use. It is apparent from FIG. 7 that this requirement is met by the recycled ink ribbon obtained in Examples 2 to 10.

(Color Difference)

Figure 8:
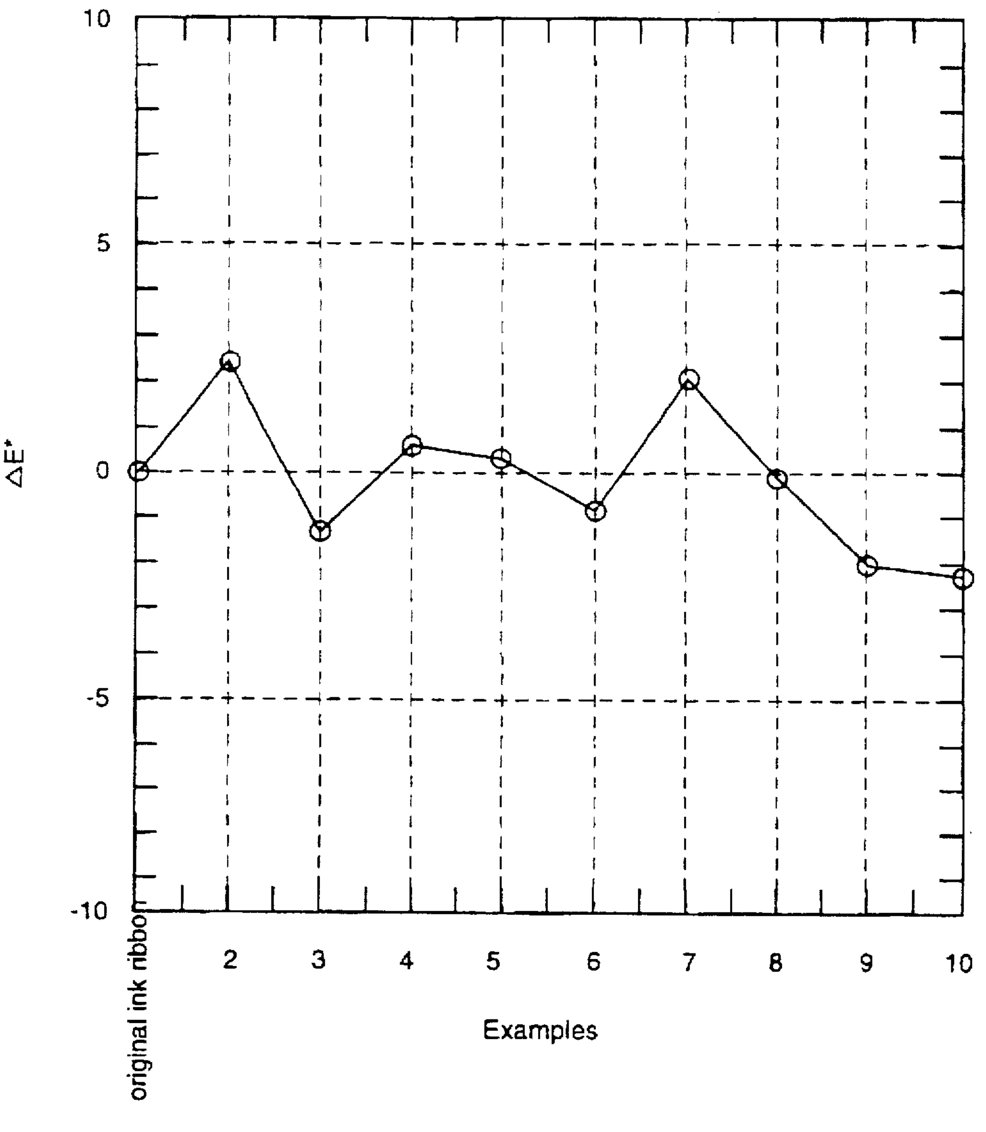
FIG. 8 is a diagram illustrating the color difference of the image produced by the recycled ink ribbon obtained in Examples 2 to 10.

A search was made for the condition under which the reference image of original ink ribbon produces an optical density of 1. The recycled ink ribbon was used to make images under the same condition as mentioned above. The resulting images were compared with the reference images to see the color difference (ΔE*) by using a color difference meter made by Gretag Co., Ltd. The results are shown in FIG. 8.

It is desirable that the absolute value of ΔE* be lower than 5 for practical use. It is apparent from FIG. 8 that this requirement is met by the recycled ink ribbon obtained in Examples 2 to 10.

EXAMPLE 11

The same original ink ribbon obtained in Example 1 was used for color image printing on commercial printing paper (UPC-7010) by a video printer (UP-D7000), both made by Sony Corp. After repeated printing for 100 images, the used print ribbon was discarded.

The discarded ink ribbon was cut into pieces (A4 size) for each color, and they were treated in a beaker with 20 ml of various solvents shown in Table 2, so that the ink layer was dissolved.

The ink ribbon was removed from the beaker and the solution in the beaker was filtered out to remove solids. The solution was freed of solvent by evaporation to give solids.

The thus obtained solids were dissolved in 50 cc of tetrahydrofuran and the solution was examined by GPC to see the suitability of the solvent for recovery of dye or binder resin from ink ribbon. The suitability was rated according to the following criteria. The results are shown in Table 2 together with the solubility parameter of each solvent.

a: Chromatogram has peaks due to both binder resin and dye.

b: Chromatogram has peaks due to dye only.

c: Chromatogram has no peaks due to binder resin and dye.

TABLE 2

| Solvent | Solubility parameter | Criteria |
|---|---|---|
| Toluene | 8.9 | a |
| 2-butanone | 9.3 | a |
| Methanol | 14.5 | b |
| Ethanol | 12.7 | b |
| Acetonitrile | 11.8 | b |
| Dichloroethane | 10.0 | a |
| Heptane | 7.2 | c |
| Hexane | 7.4 | c |
| Water | 24.2 | c |
| Waterl2-butanone (2/8) | — | a |
| Water/2-butanone (4/6) | — | b |
| Water/2-butanone (6/4) | — | b |
| Water/2-butanone (8/2) | — | c |
| Methanol/2-butanone (9/1) | — | b |
| Methanol/2-butanone (8/2) | — | b |
| Methanol/2-butanone (7/3) | — | a |

It is noted from Table 2 that it is possible to extract dye alone from the ink layer of ink ribbon by using an organic solvent having a solubility parameter higher than 11. In other words, such a solvent permits efficient separation of dye from binder resin in the ink layer.

EXAMPLE 12

The recovered Y ink ribbon obtained in Example 1 was heated in a vacuum heat chamber as shown in FIG. 4 at 200° C. and 750 mmHg under a nitrogen atmosphere. It was possible to recover Y dye in a trap cooled with liquid nitrogen.

EXAMPLE 13

The discarded ink ribbon in Example 1 underwent dye recovery by spraying each ink surface of Y, M, and C with methanol as shown in FIG. 3. There was obtained solutions each containing dye and binder resin. The solutions were treated in the same way as in Example 1 to recover dye and binder resin.

EXAMPLE 14

The discarded ink ribbon in Example 1 underwent dye recovery by rubbing each ink surface of Y, M, and C with Ben cotton impregnated with 2-butanone. The Ben cotton was crumpled in 2-butanone in a beaker. The resulting solutions were treated in the same way as in Example 1 to recover dye and binder resin.

EXAMPLE 15

This example demonstrates the ink recovery apparatus shown in FIG. 6. The discarded ink ribbon in Example 1 underwent dye recovery by treatment of each ink surface of Y, M, and C with 2-butanone. There were obtained solutions each containing dye and binder resin. These solutions were treated in the same way as in Example 1 to recover dye and binder resin.

What is claimed is:

1. A method for recovering binder resin from an ink layer of an ink ribbon, said method comprising the following steps: collecting an ink ribbon having an ink layer comprising dye and binder resin, mixing the ink ribbon in a solvent in which the dye and the binder resin are soluble resulting in a dissolving of the dye and the binder in a resulting solution and a suspension of insoluble matter including ribbon in the resulting solution, freeing the resulting solution of the insoluble matter, concentrating the resulting solution to create a resulting concentrate, pouring the resulting concentrate into a second solvent in which dye is soluble but binder resin is substantially insoluble, thereby precipitating binder resin, and separating and drying precipitates.

2. A method for recovering dye from an ink layer of an ink ribbon, said method comprising the following steps: collecting an ink ribbon having an ink layer comprising a dye and a binder resin, mixing the ink ribbon in a first solvent in which the dye and the binder resin are soluble resulting in a dissolving of the dye and the binder in a resulting solution and a suspension of insoluble matter including ribbon in the resulting solution, freeing the resulting solution of the insoluble matter, concentrating the resulting solution to create a resulting concentrate, pouring the resulting concentrate into a second solvent in which dye is soluble but binder resin is substantially insoluble, thereby precipitating binder resin, concentrating the solution remaining after precipitation of binder resin, and drying the concentrate.

3. The method for recovering binder resin of claim 1 wherein the solvent in which dye is soluble but binder resin is substantially insoluble is one which has a solubility parameter of greater than 11.

4. The method for recovering binder resin of claim 1 wherein the step of concentrating the solution is further characterized as removing solvent in which dye and binder resin are soluble using vacuum evaporation.

5. The method for recovering binder resin of claim 1 further comprising the step of recovering residual dye from the binder resin precipitate by dissolving the binder resin precipitate in a small amount of solvent in which both the dye and resin binder are soluble and pouring the resulting concentrate into a solvent in which the dye is soluble but the binder resin is substantially insoluble.

6. The method for recovering binder resin of claim 1 wherein the solvent in which dye soluble but binder resin is substantially insoluble is selected from the group consisting of methanol, ethanol, acetonitrile, butanol, acetanilide, dimethylformamide and cyclohexanol.

7. The method for recovering binder resin of claim 1 wherein the solvent in which dye is soluble but binder resin is substantially insoluble comprises a mixture of 2-butanol and water.

8. The method for recovering binder resin of claim 1 wherein the solvent in which dye is soluble but binder resin is substantially insoluble comprises a mixture of 2-butanol and methanol.

9. The method for recovering binder resin of claim 1 wherein the step of freeing the resulting solution of insoluble matter comprises filtering the resulting solution.

10. The method for recovering dye of claim 2 wherein the solvent in which dye is soluble but binder resin is substantially insoluble is one which has a solubility parameter of greater than 11.

11. The method for recovering dye of claim 2 wherein the step of concentrating the solution is further characterized as removing solvent in which dye and binder resin are soluble using vacuum evaporation.

12. The method for recovering dye of claim 2 further comprising the step of recovering residual dye from the binder resin precipitate by dissolving the binder resin precipitate in a small amount of solvent in which both the dye and resin binder are soluble and pouring the resulting concentrate into a solvent in which the dye is soluble but the binder resin is substantially insoluble.

13. The method for recovering dye of claim 2 wherein the solvent in which dye soluble but binder resin is substantially insoluble is selected from the group consisting of methanol, ethanol, acetonitrile, butanol, acetanilide, dimethylformamide and cyclohexanol.

14. The method for recovering dye of claim 2 wherein the solvent in which dye is soluble but binder resin is substantially insoluble comprises a mixture of 2-butanol and water.

15. The method for recovering dye of claim 2 wherein the solvent in which dye is soluble but binder resin is substantially insoluble comprises a mixture of 2-butanol and methanol.

16. The method for recovering dye of claim 2 wherein the step of freeing the resulting solution of insoluble matter comprises filtering the resulting solution.

* * * * *